United States Patent
Putnam

(10) Patent No.: US 6,824,157 B1
(45) Date of Patent: Nov. 30, 2004

(54) TELESCOPING TOWER HITCH ASSEMBLY

(76) Inventor: Rex D. Putnam, 10201 Moser Dr., Bronson, MI (US) 49028

( * ) Notice: Subject to any disclaimer, the term of this patent is extended or adjusted under 35 U.S.C. 154(b) by 0 days.

(21) Appl. No.: 10/288,145

(22) Filed: Nov. 5, 2002

Related U.S. Application Data

(60) Provisional application No. 60/332,594, filed on Nov. 6, 2001.

(51) Int. Cl.[7] .................................................. B60D 1/52
(52) U.S. Cl. ................... 280/491.1; 280/490.1; 280/901
(58) Field of Search .................. 280/490.1, 491.1, 280/491.5, 901

(56) References Cited

U.S. PATENT DOCUMENTS

| | | | | |
|---|---|---|---|---|
| 3,796,444 A | * | 3/1974 | Hixon ......................... 280/483 |
| 4,248,451 A | * | 2/1981 | Usinger ..................... 280/490.1 |
| 4,546,994 A | * | 10/1985 | Taylor ....................... 280/423.1 |
| 4,662,647 A | * | 5/1987 | Calvert ..................... 280/490.1 |
| 4,832,358 A | * | 5/1989 | Bull ........................... 280/418.1 |
| 5,016,898 A | * | 5/1991 | Works et al. ................ 280/433 |
| 5,143,393 A | * | 9/1992 | Meyer ...................... 280/491.1 |
| 5,344,172 A | | 9/1994 | Juan |
| 5,975,553 A | | 11/1999 | Van Vleet |
| 6,341,795 B1 | * | 1/2002 | Zerkel ...................... 280/490.1 |
| 6,386,570 B2 | | 5/2002 | Linger et al. |

* cited by examiner

*Primary Examiner*—Kevin Hurley
(74) *Attorney, Agent, or Firm*—Mary M. Moyne; Ian C. McLeod

(57) ABSTRACT

An adjustable hitch assembly for mounting in the bed of a truck. The hitch assembly includes a mounting assembly for removably securing the hitch assembly in the bed of the truck. The mounting assembly has end rails and side rails with a mounting sleeve mounted between the side rails. The telescoping tower includes an inner tower and a top plate and is slidably inserted into the interior of the mounting sleeve. The inner tower of the telescoping tower has holes which can be aligned with holes in the mounting sleeve. Pins are inserted into the holes in the mounting sleeve and holes in the inner tower to secure the inner tower at a set height in the mounting sleeve.

16 Claims, 3 Drawing Sheets

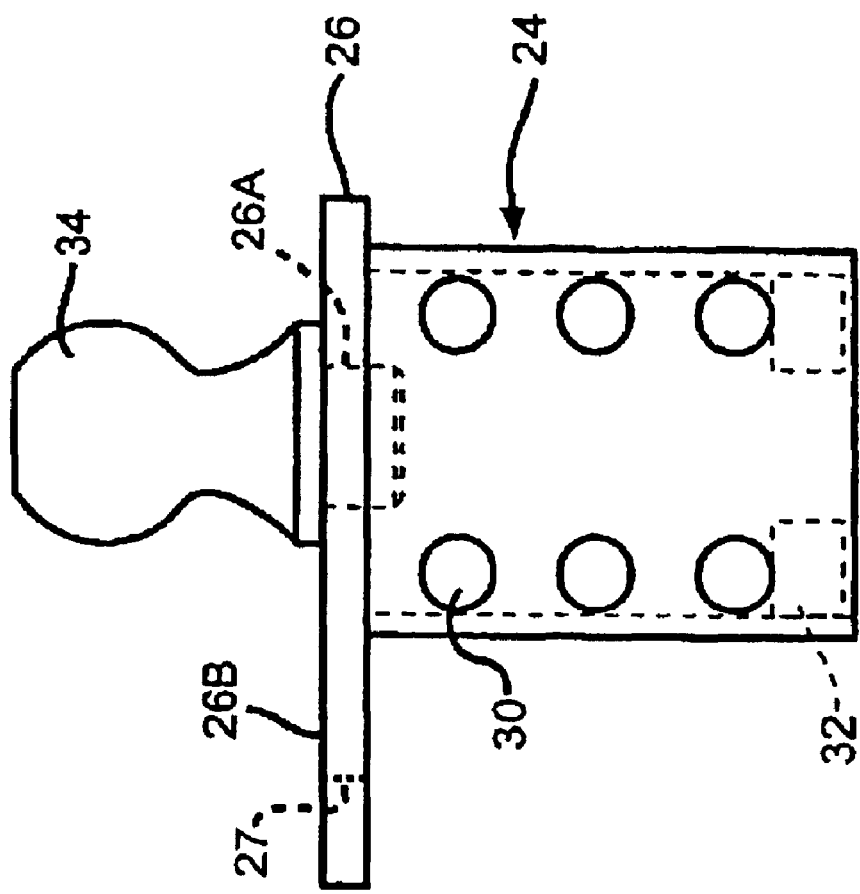

US 6,824,157 B1

TELESCOPING TOWER HITCH ASSEMBLY

CROSS-REFERENCE TO RELATED APPLICATIONS

This application claims the benefit of U.S. Provisional Application Ser. No. 60/332,594, filed Nov. 6, 2001.

STATEMENT REGARDING FEDERALLY SPONSORED RESEARCH OR DEVELOPMENT

Not Applicable

BACKGROUND OF THE INVENTION (1) Field of the Invention

The present invention relates to a hitch assembly which is vertically adjustable. In particular, the present invention relates to a hitch assembly having a telescoping tower which allows for raising and lowering the height of the hitch ball in the bed of the truck to establish the correct towing height.

(2) Description of the Related Art

The related art has shown various types of hitch assemblies which have an adjustable height. Illustrative are U.S. Pat. No. 5,344,172 to Juan; U.S. Pat. No. 5,975,553 to Van Vleet; and U.S. Pat. No. 6,386,570 to Linger et al.

Jaun shows a trailer hitch assembly system for mounting a gooseneck or fifth wheel type trailer hitch in the bed of a pickup truck. The hitch assembly system includes a support member having a well which is mounted below the surface of the bed of the pickup truck. A base portion is mounted in the well and extends above the surface of the bed of the pickup truck. The base portion can have a plurality of openings which allows the trailer hitch receiver to be fixed at various vertical positions. A locking pin or securing clip mechanism is used to hold the trailer hitch receiver in place on the base portion. The bed of the truck must be modified to allow for use of this trailer hitch assembly.

Van Vleet shows a hitch ball coupling device which is vertically adjustable. However, this coupling device is intended to be mounted to the rear of the towing vehicle and is not intended to be mounted in the bed of a truck.

Linger et al shows a fifth wheel hitch assembly having head supports which are height adjustable to enforce the versatility of the hitch assembly in interconnecting towing vehicles and towed vehicles of various heights and dimensions. This hitch assembly can not be easily adjusted by a single user.

There remains the need for a hitch assembly which is mounted in the bed of a truck and which can be vertically adjusted quickly and easily by a single user and which does not require extensive modification of the bed of the truck.

SUMMARY OF THE INVENTION

An adjustable hitch assembly for mounting in the bed of a truck. The hitch assembly includes a mounting assembly for removably securing the hitch assembly in the bed of the truck. The mounting assembly has end rails and side rails with a mounting sleeve mounted between the side rails. The telescoping tower includes an inner tower and a top plate and is slidably inserted into the interior of the mounting sleeve. The inner tower of the telescoping tower has holes which can be aligned with holes in the mounting sleeve. Pins are provided to insert through the holes of the mounting sleeve and the telescoping tower. To secure the hitch ball at a desired height, the pins are inserted into the holes in the mounting sleeve and holes in the inner tower to secure the inner tower at a set height in the mounting sleeve. In one (1) embodiment, the mounting sleeve and the inner tower have a square cross-section with front and back walls. In this embodiment, the front and back walls of the mounting sleeve each have a pair of holes with the holes spaced apart along a horizontal line. The inner tower has several pairs of holes which can be aligned with the holes of the mounting sleeve to adjust the height of the hitch ball. In one (1) embodiment, a fifth wheel head assembly is connected by an adaptor to the hitch ball. Thus, by adjusting the height of the hitch ball, the height of the fifth wheel head assembly can be adjusted. In this embodiment, the flange of the top plate of the telescoping tower has a notch which is engaged by the fifth wheel head assembly and prevents the head assembly from rotating when the towed vehicle turns.

The present invention relates to an adjustable hitch assembly for mounting in a bed of a truck which comprises: a mounting assembly for mounting to the bed of the truck; a mounting sleeve mounted on the mounting assembly and having a sidewall with holes in the sidewall; a telescoping tower slidably mounted in the mounting sleeve and having opposed ends with a sidewall extending between the ends and having holes in the sidewall; a top plate mounted at one end of the telescoping tower; a hitch ball mounted on the top plate; and a pair of pins configured to be inserted through the holes in the mounting sleeve and through the holes in the telescoping tower to secure the telescoping tower in the mounting sleeve.

Further, the present invention relates to a hitch assembly for mounting in a bed of a truck, which comprises: a pair of end rails having opposed ends and configured to be mounted on the bed of the truck; a pair of side rails having opposed ends and mounted at the opposed ends to the end rails such that the side rails extend between the end rails and are perpendicular to the end rails and parallel to each other; a mounting sleeve mounted between the side rails and spaced between the end rails, the mounting sleeve having a sidewall with at least two horizontally aligned holes in the sidewall; a tower slidably mounted in the mounting sleeve and having opposed ends with a sidewall extending therebetween with at least two horizontally aligned holes in the sidewall; a top plate mounted on one end of the tower; a hitch ball mounted on the top plate; and at least two pins configured to be inserted into the holes in the mounting sleeve and the holes in the tower to secure the tower in the mounting sleeve at a desired height.

Still further, the present invention relates to a method for adjusting a height of a hitch ball in a bed of a truck, which comprises the steps of: providing a hitch assembly having a mounting assembly for mounting to the bed of the truck; a mounting sleeve mounted on the mounting assembly and having a sidewall with holes in the sidewall; a tower slidably mounted in the mounting sleeve and having opposed ends with a sidewall extending between the ends and having holes in the sidewall; a top plate mounted at one end of the tower; a hitch ball mounted on the top plate; and a pair of pins configured to be inserted through the holes in the mounting sleeve and through the holes in the tower to secure the tower in the mounting sleeve; mounting the mounting assembly in the bed of the truck; inserting the tower in the mounting sleeve; sliding the tower in the mounting sleeve until holes in the sidewall of the tower are aligned with holes in the mounting sleeve and the hitch ball is essentially at a desired height spaced apart from the bed of the truck; and inserting the pins into and through the holes in the mounting sleeve and into the holes and through the holes in the tower.

The substance and advantages of the present invention will become increasingly apparent by reference to the following drawings and the description.

BRIEF DESCRIPTION OF THE DRAWING(S)

FIG. 3 is a front view of the telescoping tower 24.

DESCRIPTION OF THE PREFERRED EMBODIMENT(S)

Figure 1:
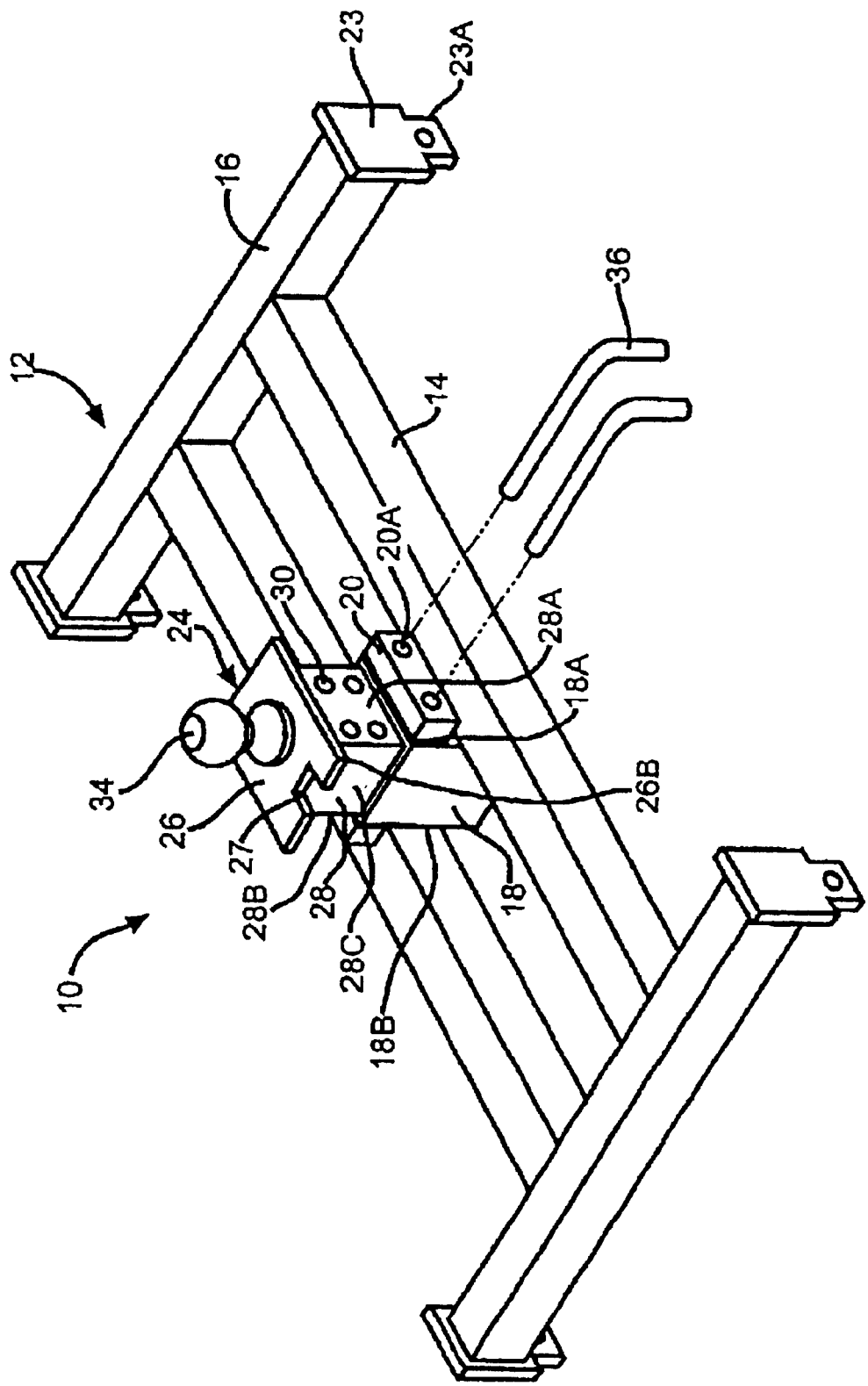
FIG. 1 is a perspective view of the hitch assembly 10 of the present invention mounted on a mounting assembly 12.
Figure 2:
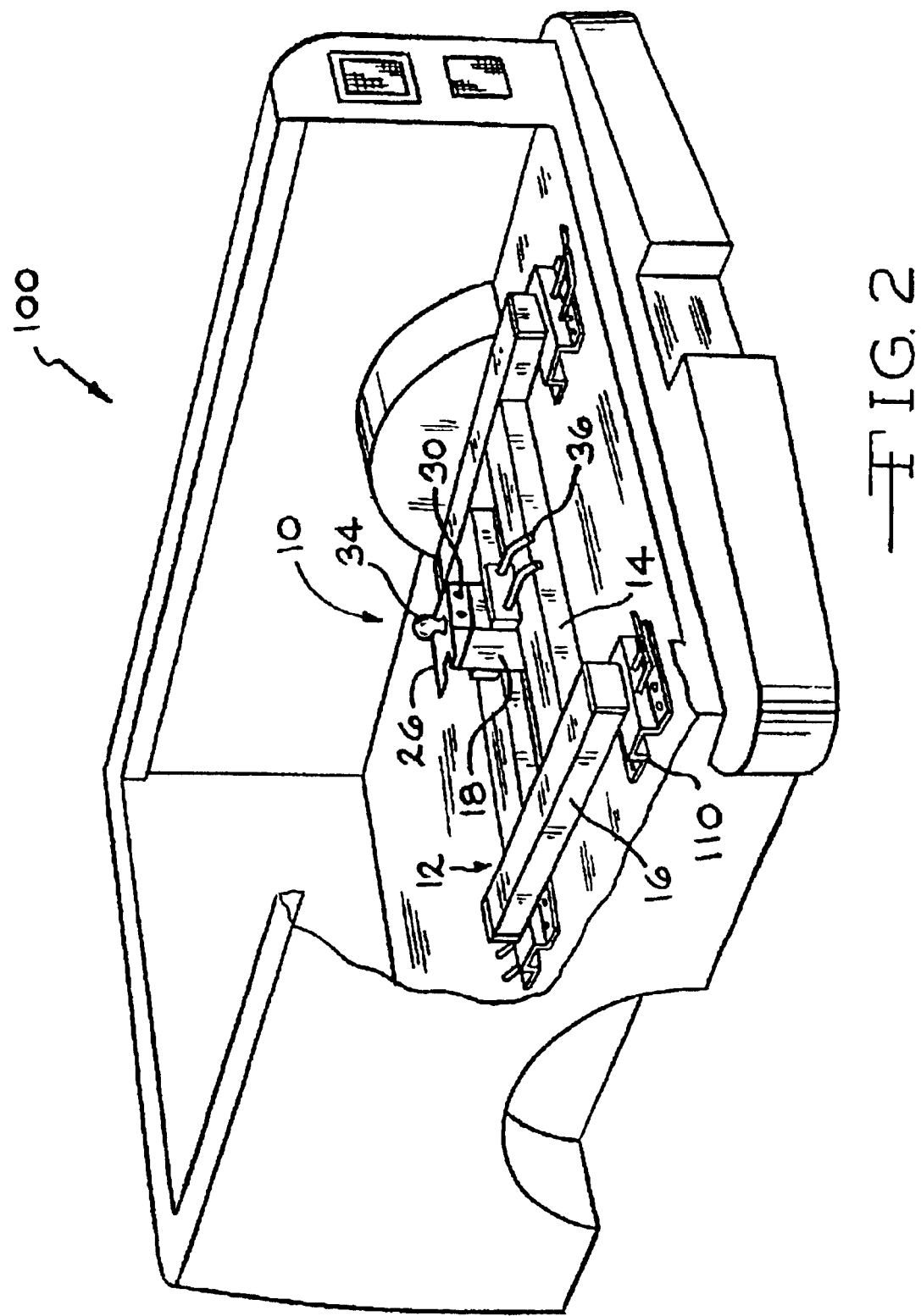
FIG. 2 is a perspective view of the hitch assembly 10 mounted in the bed of a truck 100.

FIGS. 1 to 3 show the telescoping hitch assembly 10 of the present invention. The hitch assembly 10 is intended to be mounted in the bed of a towing vehicle such as a pickup truck 100. In one (1) embodiment, the hitch assembly 10 is used to mount a fifth wheel head assembly (not shown) in the bed of a pickup truck 100 by use of a hitch ball 34 and adaptor. In this embodiment, the ability to adjust the height of the hitch assembly 10 allows the height of the head assembly to be varied to establish the correct towing height. The hitch assembly 10 includes a mounting assembly 12 and a telescoping tower 24 with a hitch ball 34. The mounting assembly 12 can be of a variety of shapes and forms which allows the telescoping tower 24 to be securely mounted to a towing vehicle such as in the bed of a pickup truck 100. In one (1) embodiment, the mounting assembly 12 includes a pair of side rails 14, a pair of end rails 16 and a mounting sleeve 18. The ends of the side rails 14 are permanently mounted to the end rails 16 between the ends of the end rails 16. The end rails 16 are spaced apart and parallel to each other. The side rails 14 are mounted such as to be spaced apart and parallel to each other and perpendicular to the end rails 16. The end rails 16 extend parallel to the sides of the bed of the truck 100 and the side rails 14 extend perpendicular to the sides of the bed of the truck 100 (FIG. 1). The end rails 16 and side rails 14 can be constructed of any material and can be a variety of shapes. In one (1) embodiment, the end rails 16 and side rails 14 are constructed of hollow, tubular metal having a square cross-section. In one (1) embodiment, the mounting assembly 12 is intended to be mounted on mounting rails (not shown) or mounting pads 110 in the bed of a pickup truck 100. The mounting rails or mounting pads 110 are secured to the frame rails of the truck 100 through the bed of the truck 100. In one (1) embodiment, end caps 23 are permanently mounted on the ends of the end rails 16. The end caps 23 have extensions 23A which extend downward to allow for securing the mounting assembly 12 to mounting pads 110 secured to the towing vehicle. The extensions 23A extend through a slot in the mounting pad 110. A pin 36 is then inserted through the hole in the extension 23A to secure the extension 23A in the mounting pad 110.

The mounting sleeve 18 is mounted between the side rails 14 of the mounting assembly 12. The mounting sleeve 18 has a top end and a bottom end with a sidewall extending therebetween forming a hollow interior. The mounting sleeve 18 has a length such as to extend above and below the side rails 14. In one (1) embodiment, the length of the mounting sleeve 18 is essentially the same as the length of the inner tower 28. Preferably the length of the mounting sleeve 18 is such that the mounting sleeve 18 extends below the side rails 14 but does not contact the bed of the truck 100 such that a hole does not need to be provided in the bed of the truck 100. In one (1) embodiment, the mounting sleeve 18 is spaced the same distance from each end rail 16. However, it is understood that the position of the mounting sleeve 18 depends on the ultimate position of the hitch ball 34. The mounting sleeve 18 is provided with holes (not shown). In one (1) embodiment, the mounting sleeve 18 is hollow with a square cross-section. In this embodiment, the mounting sleeve 18 has a front wall 18A and a back wall 18B. The front and back walls 18A and 18B of the mounting sleeve 18 are provided with a pair of horizontally spaced holes. A pair of reinforcing bars 20 are mounted on the front and back walls 18A and 18B of the mounting sleeve 18 adjacent the top end of the mounting sleeve 18. The reinforcing bars 20 have holes 20A which are aligned with the holes in the mounting sleeve 18. The reinforcing bars 20 provide additional strength to the front and back walls 18A and 18B of the mounting sleeve 18 around the holes.

The telescoping tower 24 is slidably inserted into the hollow interior of the mounting sleeve 18 from the top end. The telescoping tower 24 includes a top plate 26 mounted at the top end of an inner tower 28. In the preferred embodiment, the inner tower 28 has the same cross-sectional shape as the mounting sleeve 18. In one (1) embodiment, the inner tower 28 has a circular cross-section. In another embodiment, the inner tower 28 has a square cross-section. In this embodiment, the inner tower 28 has a front wall 28A and back wall 28B with sidewalls 28C extending therebetween. The inner tower 28 is inserted into the mounting sleeve 18 such that the front wall 28A of the inner tower 28 is adjacent and parallel to the front wall 18A of the mounting sleeve 18. The front and back walls 28A of the inner tower 28 and 28B each have at least one pair of holes 30. Each pair of holes 30 in the front wall 28A is aligned with a pair of holes 30 in the back wall 28B. In one (1) embodiment, the inner tower 28 has three (3) pairs of holes 30 (FIG. 3). The pairs of holes 30 are spaced apart vertically along a length of the inner tower 28. The holes 30 of each pair are preferably aligned horizontally. A pair of pins 36 are provided for inserting through the pairs of holes 30 in the inner tower 28 and in the mounting sleeve 18 (FIG. 2). One (1) end of the pins 36 is preferably angled to act as a handle to allow for easier removal of the pins 36 from the holes 30 in the inner tower 28 and the mounting sleeve 18. The angled end of the pins 36 also prevents the pins 36 from extending completely through the holes 30. Each of the sidewalls 28C of the inner tower 28 is provided with an inner flange 32 on the inner side of the inner tower 28 adjacent the second end (FIG. 3). The inner flanges 32 can be provided as an integral part of the inner tower 28 or can be a separate piece mounted to the interior of the inner tower 28. The flanges 32 extend below the lowermost pair of holes 30 in the inner tower 28 and act to provide support for the lowermost pair of holes 30 when the pins 36 are inserted in the holes 30. The inner flanges 32 also act to strengthen the sidewalls 28C of the inner tower 28. The inner tower 28 has the same cross-sectional shape as the mounting sleeve 18 and is slightly smaller in size such as to be able to easily slide within the mounting sleeve 18. The top plate 26 has a size greater than the opening at the top end of the mounting sleeve 18 such that the telescoping tower 24 can not extend completely through the mounting sleeve 18. The top plate 26 is larger in size than the outer perimeter of the top end of the inner tower 28 such that the top plate 26 extends beyond a side of the cylinder 28 providing a flange 26B. In one (1) embodiment, the hitch assembly 10 is used to mount a fifth wheel head assembly (not shown). In this embodiment, the flange 26B of the top plate 26 is provided with a notch 27 along one (1) edge which prevents the fifth wheel head assembly from turning out of position when the towed vehicle or trailer turns. In one (1) embodiment, the notch 27 is in the edge of the flange 26B parallel to the side of the towing vehicle. The top plate 26 is provided with a hole 26A which allows for mounting the hitch ball 34. The hole 26A is preferably aligned with the center of the inner tower 28. The hitch ball 34 can be permanently or removably mounted on the telescoping tower 24. The hitch ball 34 can be of any size and is preferably similar to standard hitch balls well known in the art.

To use the hitch assembly 10, the mounting assembly 12 is mounted to the bed of the towing vehicle or truck 100. To adjust the height of the hitch ball 34, the pins 36 are removed from the mounting sleeve 18 and the inner tower 28. Next, the inner tower 28 is adjusted in the mounting sleeve 18 until the hitch ball 34 is at the desired height or essentially the desired height and the pairs of holes in the mounting sleeve 18 are aligned with one of the pairs of holes 30 in the inner tower 28. The pins 36 are then inserted into the holes in the mounting sleeve 18 and the holes 30 in the inner tower 28 until the pins 36 extend completely through the mounting sleeve 18 and the inner tower 28. Preferably, the hitch assembly 10 is able to be easily adjusted by a single user. Preferably, the mounting assembly 12 is spaced above the bed of the truck 100 and the inner tower 28 is of such a length that when the telescoping tower 24 is in the lowermost position with the uppermost pair of holes 30 of the inner tower 28 in line with the holes of the mounting sleeve 18, the bottom end of the inner tower 28 opposite the top plate 26, is spaced above the bed of the truck 100. In one (1) embodiment, when the telescoping tower 24 is in the lowest position, the bottom end of the inner tower 28 does not extend beyond the mounting sleeve 18 and does not contact the bed of the truck 100. In one (1) embodiment, the tower 24 can be adjusted vertically to three (3) different heights. Preferably, the telescoping tower 24 is able to be raised a total of 3.0 inches (7.6 cm). In one (1) embodiment, the tower 24 is raised in 1.5 inch (3.8 cm) increments.

It is intended that the foregoing description be only illustrative of the present invention and that the present invention be limited only by the hereinafter appended claims.

I claim:

1. An adjustable hitch assembly for mounting in a bed of a truck which comprises:
   (a) a mounting assembly configured to be mounted in the bed of the truck;
   (b) a mounting sleeve mounted on the mounting assembly and having a sidewall with holes in the sidewall;
   (c) reinforcing bars mounted adjacent the holes in sidewall of the mounting sleeve and having holes which are aligned with the holes in the sidewall of the mounting sleeve;
   (d) a telescoping tower slidably mounted in the mounting sleeve and having opposed ends with a sidewall extending between the ends and having holes in the sidewall;
   (e) a top plate mounted at one end of the telescoping tower;
   (f) a hitch ball mounted on the top plate; and
   (g) a pair of pins configured to be inserted through the holes in the mounting sleeve and through the holes in the telescoping tower to secure the telescoping tower in the mounting sleeve.

2. The hitch assembly of claim 1 wherein the mounting sleeve and the telescoping tower have a square cross-sectional shape.

3. The hitch assembly of claim 2 wherein the mounting sleeve has a front wall and a back wall with a pair of first holes in the front wall and a pair of second holes in the back wall wherein the pair of first holes is aligned with the pair of second holes, wherein the telescoping tower has a front wall and a back wall with at least one pair of first holes in the front wall and at least one pair of second holes in the back wall wherein each pair of first holes in the front wall of the telescoping tower is aligned with one pair of second holes in the back wall of the telescoping tower and wherein when the hitch ball is at a desired height, the pair of first and second holes of the mounting sleeve are aligned with one of the pairs of first and second holes of the telescoping tower.

4. The hitch assembly of claim 1 wherein the pins have an angled end which acts as a handle for inserting and removing the pins.

5. The hitch assembly of claim 1 wherein the mounting assembly is spaced above the bed of the truck and wherein a length of the telescoping tower is such that in a lowermost position, the end of the telescoping tower opposite the top plate is spaced apart from the bed of the truck.

6. The hitch assembly of claim 1 wherein a fifth wheel head assembly is attached to the hitch ball and wherein the top plate is configured to engage the fifth wheel head assembly to prevent the fifth wheel head assembly from rotating on the hitch ball.

7. The hitch assembly of claim 6 wherein the top plate has a flange and wherein the flange has a notch which is engaged by the fifth wheel head assembly to prevent the fifth wheel head assembly from rotating.

8. A hitch assembly for mounting in a bed of a truck, which comprises:
   (a) a pair of end rails having opposed ends and configured to be mounted on the bed of the truck;
   (b) a pair of side rails having opposed ends and mounted at the opposed ends to the end rails such that the side rails extend between the end rails and are perpendicular to the end rails and parallel to each other;
   (c) a mounting sleeve mounted between the side rails and spaced between the end rails, the mounting sleeve having a sidewall with at least two horizontally aligned holes in the sidewall;
   (d) a tower slidably mounted in the mounting sleeve and having opposed ends with a sidewall extending therebetween with at least two horizontally aligned holes in the sidewall;
   (e) a top plate mounted on one end of the tower;
   (f) a hitch ball mounted on the top plate; and
   (g) at least two pins configured to be inserted into the holes in the mounting sleeve and the holes in the inner tower to secure the tower in the mounting sleeve at a desired height.

9. The hitch assembly of claim 8 wherein the mounting sleeve and the tower have a square cross-sectional shape.

10. The hitch assembly of claim 9 wherein the mounting sleeve has a front wall and a back wall with a pair of first holes in the front wall and a pair of second holes in the back wall wherein the pair of first holes is aligned with the pair of second holes, wherein the tower has a front wall and a back wall with at least one pair of first holes in the front wall and at least one pair of second holes in the back wall wherein each pair of first holes in the front wall of the tower is aligned with one pair of second holes in the back wall of the tower and wherein when the hitch ball is at a desired height, the pairs of first and second holes of the mounting sleeve are aligned with a single pair of first and second holes of the tower.

11. The hitch assembly of claim 8 wherein reinforcing bars are mounted adjacent the holes in the mounting sleeve and wherein the reinforcing bars have holes which are aligned with the holes in the sidewall of the mounting sleeve.

12. The hitch assembly of claim 8 wherein the pins have an angled end which acts as a handle for inserting and removing the pins.

13. The hitch assembly of claim 8 wherein the mounting assembly is spaced above the bed of the truck and wherein a length of the tower is such that in a lowermost position, the tower is spaced apart from the bed of the truck.

14. The hitch assembly of claim 8 wherein a fifth wheel head assembly is attached to the hitch ball, wherein the top plate is configured to engage the fifth wheel head assembly to prevent the fifth wheel head assembly from rotating on the hitch ball.

15. A method for adjusting a height of a hitch ball in a bed of a truck which comprises the steps of:

(a) providing a hitch assembly having a mounting assembly for mounting to the bed of the truck; a mounting sleeve mounted on the mounting assembly and having a sidewall with holes in the sidewall; a tower slidably mounted in the mounting sleeve and having opposed ends with a sidewall extending between the ends and having holes in the sidewall; a top plate mounted at one end of the tower; a hitch ball mounted on the top plate; and a pair of pins configured to be inserted through the holes in the mounting sleeve and through the holes in the tower to secure the tower in the mounting sleeve;

(b) mounting the mounting assembly in the bed of the truck;

(c) inserting the tower in the mounting sleeve;

(d) sliding the tower in the mounting sleeve until holes in the sidewall of the tower are aligned with holes in the mounting sleeve and the hitch ball is essentially at a desired height spaced apart from the bed of the truck; and (e) inserting the pins into and through the holes in the mounting sleeve and into the holes and through the holes in the tower.

16. An adjustable hitch assembly for mounting in a bed of a truck which comprises:

(a) a mounting assembly configured to be mounted in the bed of the truck;

(b) a mounting sleeve mounted on the mounting assembly and having a sidewall with holes in the sidewall;

(c) a telescoping tower slidably mounted in the mounting sleeve and having opposed ends with a sidewall extending between the ends and having holes in the sidewall;

(d) a top plate mounted at one end of the telescoping tower;

(e) a hitch ball mounted on the top plate;

(f) a fifth wheel head assembly attached to the hitch ball wherein the top plate is configured to engage the fifth wheel head assembly to prevent the fifth wheel head assembly from rotating on the hitch ball; and (g) a pair of pins configured to be inserted through the holes in the mounting sleeve and through the holes in the telescoping tower to secure the telescoping tower in the mounting sleeve.

* * * * *